(12) United States Patent
Dickey (10) Patent No.: US 9,559,631 B2
(45) Date of Patent: *Jan. 31, 2017

(54) CLAMP ASSEMBLY FOR SOLAR PANELS (71) Applicant: Don Dickey, San Antonio, TX (US)

(72) Inventor: Don Dickey, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,665

(22) Filed: Dec. 14, 2015

(65) Prior Publication Data

US 2016/0233821 A1    Aug. 11, 2016

Related U.S. Application Data

(63) Continuation of application No. 14/106,983, filed on Dec. 16, 2013, now Pat. No. 9,214,891.

(51) Int. Cl.
| | |
|---|---|
| *H02S 20/23* | (2014.01) |
| *H02S 20/24* | (2014.01) |
| *F16B 2/06* | (2006.01) |
| *F24J 2/52* | (2006.01) |
| *H01L 31/042* | (2014.01) |
| *F16M 13/02* | (2006.01) |
| *H02S 20/22* | (2014.01) |
| *H02S 20/10* | (2014.01) |
| *F24J 2/00* | (2014.01) |
| *F16B 5/06* | (2006.01) |

(52) U.S. Cl.
CPC ............. *H02S 20/23* (2014.12); *F16B 2/065* (2013.01); *F16B 5/065* (2013.01); *F16M 13/02* (2013.01); *F24J 2/00* (2013.01); *F24J 2/5245* (2013.01); *F24J 2/5258* (2013.01); *H02S 20/00* (2013.01); *H02S 20/10* (2014.12); *H02S 20/22* (2014.12); *H02S 20/24* (2014.12); *Y02B 10/12* (2013.01); *Y02E 10/47* (2013.01)

(58) Field of Classification Search
CPC .......... H02S 20/00; H02S 20/10; H02S 20/22; H02S 20/23; H02S 20/24; F16M 13/02; Y02E 10/47; Y02E 10/50; F24J 2/5245; F24J 2/5247; F24J 2/5249; F24J 2/5252; F24J 2/526; F24J 2/5262; F24J 2/5258; F16B 2/065
USPC .......... 52/173.3; 248/346.01, 346.03, 346.06
See application file for complete search history.

(56) References Cited

U.S. PATENT DOCUMENTS 5,678,383 A * 10/1997 Danielewicz ............ E04D 3/06
                                              52/235
6,098,942 A *  8/2000 Heath ...................... F16B 2/065
                                              248/228.6

(Continued)

FOREIGN PATENT DOCUMENTS

DE    2520877 A2 * 11/2012 ............. F24J 2/5258
FR    2990730 A1 * 11/2013 ............. F24J 2/5245

*Primary Examiner* — Ryan Kwiecinski
(74) *Attorney, Agent, or Firm* — Gunn, Lee & Cave, P.C.

(57) ABSTRACT

A clamp assembly for solar panels comprising a base and a clamp. The base has a baseplate and first and second spaced-apart struts connected to the baseplate to form a channel. Surfaces of the struts define slots adjacent to the channel. Beams are connected to the struts. The clamp includes a plate with fingers extending from the plate into the channel. The clamp further includes angled surfaces and cylindrical surfaces defining holes through the clamp plate. The clamp assembly is preferably made from a nonconductive material to inhibit arcing and the risk of electrical fire from incorrect or failed wiring.

9 Claims, 6 Drawing Sheets (56) References Cited

U.S. PATENT DOCUMENTS

| | | | | |
|---|---|---|---|---|
| 8,424,255 B2* | 4/2013 | Lenox | .................... | F24J 2/5245 |
| | | | | 52/173.3 |
| 8,813,441 B2* | 8/2014 | Rizzo | .................... | F24J 2/5245 |
| | | | | 248/148 |
| 9,214,891 B2* | 12/2015 | Dickey | .................... | H02S 20/00 |
| 2010/0275975 A1* | 11/2010 | Monschke | ............. | F24J 2/5207 |
| | | | | 136/251 |
| 2012/0102853 A1* | 5/2012 | Rizzo | .................... | F24J 2/5245 |
| | | | | 52/173.3 |
| 2014/0109496 A1* | 4/2014 | Stapleton | ................ | E04D 13/00 |
| | | | | 52/173.3 |
| 2014/0130847 A1* | 5/2014 | West | ...................... | F24J 2/5211 |
| | | | | 136/251 |
| 2015/0113889 A1* | 4/2015 | Stapleton | ................ | H02S 20/23 |
| | | | | 52/173.3 |
| 2016/0111996 A1* | 4/2016 | Stephan | ................ | F16B 5/0028 |
| | | | | 248/316.6 |
| 2016/0111999 A1* | 4/2016 | Stapleton | ................ | H02S 20/23 |
| | | | | 52/173.3 |
| 2016/0268958 A1* | 9/2016 | Wildes | .................... | H02S 20/23 |

* cited by examiner

CLAMP ASSEMBLY FOR SOLAR PANELS

CROSS-REFERENCES TO RELATED APPLICATIONS

U.S. application Ser. No. 14/106,983, filed Dec. 16, 2013, is incorporated by reference.

STATEMENT REGARDING FEDERALLY SPONSORED RESEARCH OR DEVELOPMENT

Not applicable.

BACKGROUND

With the continual rise in conventional energy costs, solar panels are becoming more popular in residential settings. Typically, residential systems involve the use of a number of solar panels interconnected and mounted to a rooftop, and can cover many thousands of square feet. Because typical systems operate at above 400 VDC, residential codes often require that each panel of the system, as well as the mounting equipment, be grounded.

Such arrays require a sufficiently strong mounting system to support not only the weight of the array and provide sufficient resistance to wind forces. Tightly spaced panels effectively form a large surface area, which could result in damage to the panels, the mounting system, or both, under strong wind conditions. In addition, these systems must accommodate a range of surface types and conditions, including grassy fields, bare earth, cement slabs, and gravel or crushed rock.

Most panels are formed with an aluminum frame around the panel, with mounting holes in the aluminum frame on the back of the panel. The actual dimensions of the panels vary from manufacturer to manufacturer. Some panels are rectangular, while others have a more-square aspect ratio. As a result, the location of the mounting holes varies depending on the manufacturer and the specific product. Thus, the designer of the mounting structure must know the exact model of panel to be used to design an appropriate mounting structure.

For mounting hardware manufacturers, this may require the design of many different mounting brackets, increasing the costs associated with tooling and inventory control. Alternatively, some support structure configurations use special "clips" to attach the solar panels onto supporting rails. The clips slide onto the rail and are positioned in between the panels to secure the edges of the panels to the support rail. This, however, requires that the clips be slid onto the rail from the ends of the rail. If a panel is defective or damaged and needs to be replaced, it is difficult to remove a single panel. This type of mounting system also often requires extensive on-site placement, measurement, and adjustment on the part of the system installers. Moreover, these clips do not utilize the manufacturers' mounting holes, and therefore the installations may not meet the manufacturers' installation guidelines and/or invalidate warranties. Finally, conventional mounting systems require a large number of components, which increases the dollar value of inventory that must be carried by an installer to be prepared for any specific installation.

BRIEF SUMMARY OF THE INVENTION

The present invention is a clamp assembly for use in a solar panel mounting system for attaching one or more solar panels to a rooftop. The present invention is estimated to reduce rooftop labor by an installer by approximately eighty percent compared to conventional systems. The present invention also eliminates the need for mechanical bonding (grounding), which reduces the risk of fire and electrocution hazards. In addition, the present invention reduces the inventory of parts that must be carried by an installer by a factor of at least fifty.

The present invention comprises a base and a clamp. The base has a baseplate and first and second spaced-apart struts connected to the baseplate to form a channel. Surfaces of the struts define slots adjacent to the channel and beams are connected to the struts. The clamp partially occupies the channel of the base and includes a plate with fingers extending from the plate into the channel. The clamp further includes at least one angled surface adjacent to the plate. The clamp assembly is preferably made from a nonconductive material to inhibit arcing and the risk of electrical fire from incorrect or failed wiring.

DETAILED DESCRIPTION OF THE VARIOUS EMBODIMENTS

Figure 1:
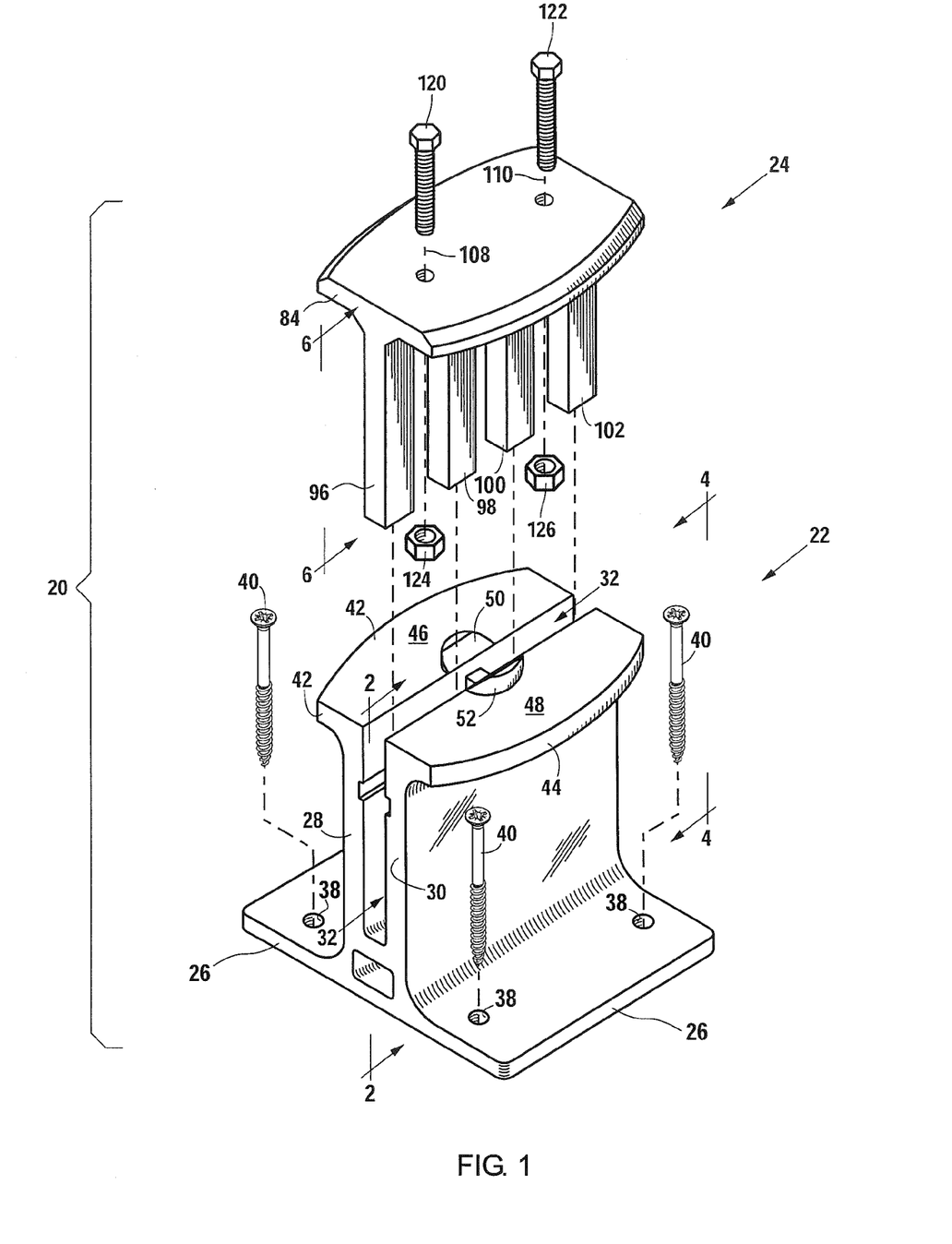
FIG. 1 is an assembly view of a first embodiment of the invention.

Referring to FIG. 1, a first embodiment 20 of the present invention comprises a base 22 and a clamp 24. The base 22 and clamp 24 are made from a nonconductive material, such as fiberglass-nylon composite. Preferably, the composite is a glass fiber reinforced resin, such as ZYTEL® 70G33L manufactured by DuPont Company.

The base 22 has a baseplate 26, a first strut 28, and a second strut 30. Both the first strut 28 and the second strut 30 are connected to (e.g., attached to, integrally formed with, etc.) the baseplate 26. The first strut 28 is spaced a distance from the second strut 30 to form a channel 32 having a U-shaped profile with an open end to receive the clamp 24. The channel 32 extends between ends of the base 22. The baseplate 26 includes cylindrical surfaces 38 defining holes for receiving fasteners, such as decking screws 40.

The base 22 further includes a first beam 42 and a second beam 44. The first beam 42 is connected to the first strut 28 opposite the baseplate 26. The first beam 42 includes a first beam surface 46. The second beam 44 is connected to the second strut 30 opposite the baseplate 26 and opposite the channel 32 from the first beam 42. The second beam 44 includes a second beam surface 48 coplanar with the first planar surface 46.

A first spacer 50 and a second spacer 52 are attached to the beams 42, 44. The first spacer 50 is connected to the first beam 42 at the first beam surface 46 adjacent to the open end of the channel 32. The second spacer 52 is connected to the second beam 44 at the second beam surface 48 adjacent to the open end of the channel 32.

Figure 2:
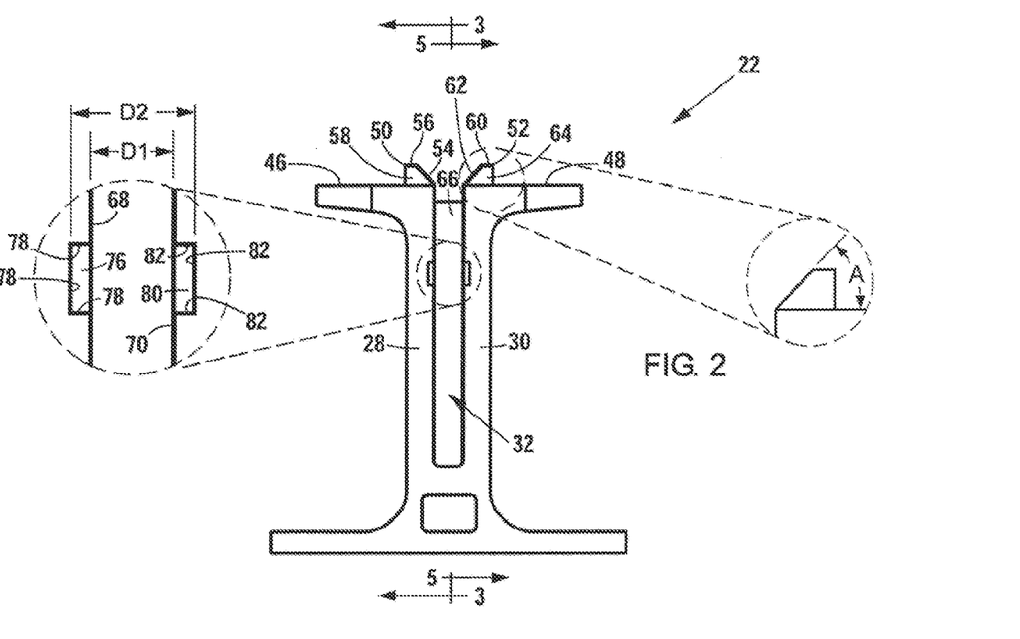
FIG. 2 is a side elevation from line 2-2 of FIG. 1.
Figure 3:
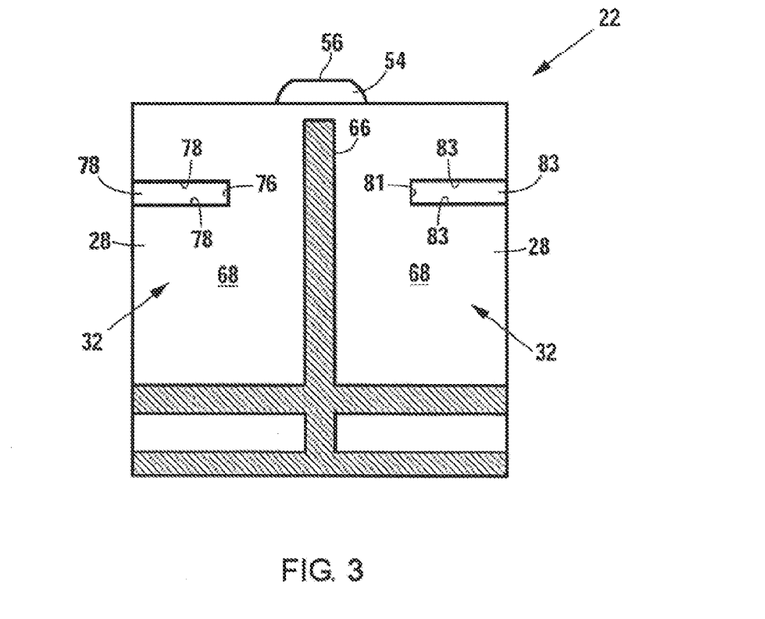
FIG. 3 is a sectional view along line 3-3 of FIG. 2.
Figure 4:
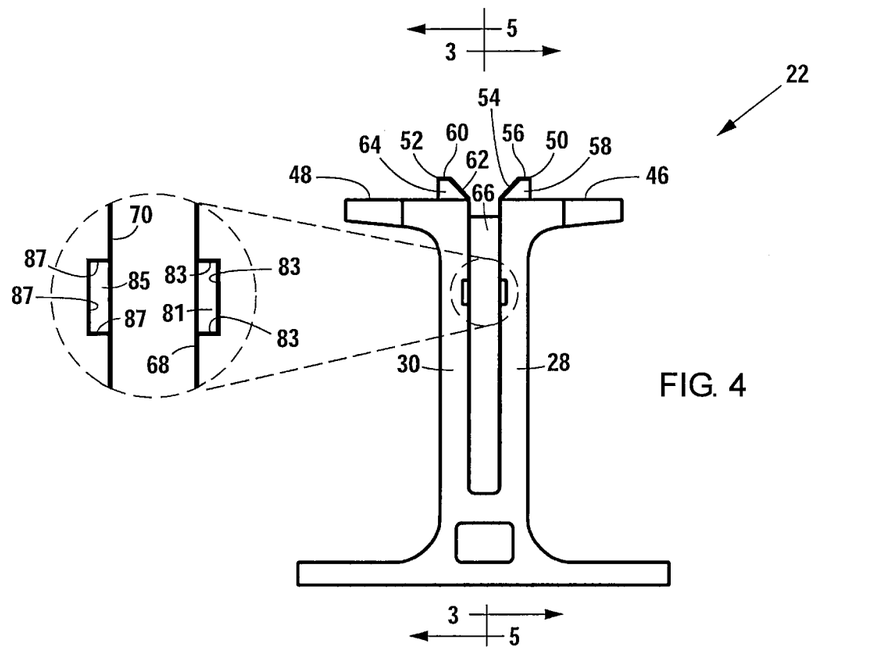
FIG. 4 is a side elevation from line 4-4 of FIG. 1.
Figure 5:
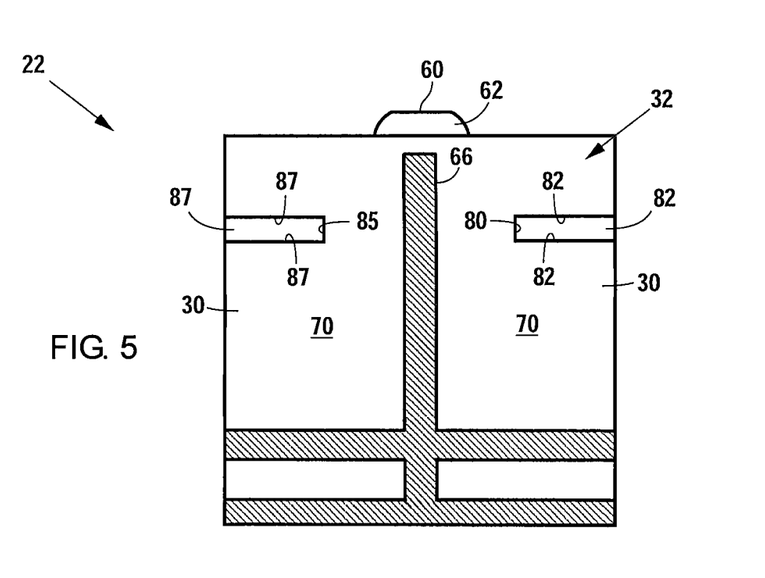
FIG. 5 is a sectional view along 5-5 of FIG. 4.

Referring to FIG. 2, the first spacer 50 has a planar first spacer surface 54 angled at an angle A relative to the first beam surface 46 and a planar second spacer surface 56 parallel to the first beam surface 46. The first spacer 50 further includes a curved third spacer surface 58 adjacent to the first and second spacer surfaces 54, 56. The angle A is forty-five degrees.

The second spacer 52 has a planar fourth spacer surface 62 angled at angle A relative to the second beam surface 48, and a planar fifth spacer surface 60 parallel the second beam surface 48 and coplanar with the second spacer surface 56. The second spacer 52 further includes a curved sixth spacer surface 64 adjacent to the fourth spacer surface 62 and fifth spacer surface 60.

Referring jointly to FIG. 2-5, a tie 66 occupies the channel 32 and is connected to the first strut 28 and the second strut 30. The first strut 28 includes a first planar surface 68 and the second strut 30 includes a second planar surface 70 opposite the first planar surface 68 and spaced a first distance D1 apart. The first strut 28 includes a first slot defined by a first slot endwall 76 adjacent and perpendicular to the first planar surface 68 and first slot sidewalk 78 adjacent and perpendicular to the endwall 76. The second strut 30 includes a second slot defined by a second slot endwall 80 adjacent and perpendicular to the second planar surface 70 and second slot sidewalls 82 adjacent and perpendicular to the second slot endwall 80. The first slot and second slot mirror one another and across a midplane of the base 22.

Referring jointly to FIG. 2-5, the first strut 28 includes a third slot defined by a third slot endwall 81 adjacent and perpendicular to the first planer surface 68 and third slot sidewalls 83 adjacent and perpendicular to the third slot endwall 81. The second strut 30 includes a fourth slot defined by a fourth slot endwall 85 adjacent and perpendicular to the second planar surface 70 and fourth slot sidewalls 87 adjacent and perpendicular to the fourth slot endwall 85. The third slot and fourth slot mirror of one another and across the midplane of the base 22.

Figure 6:
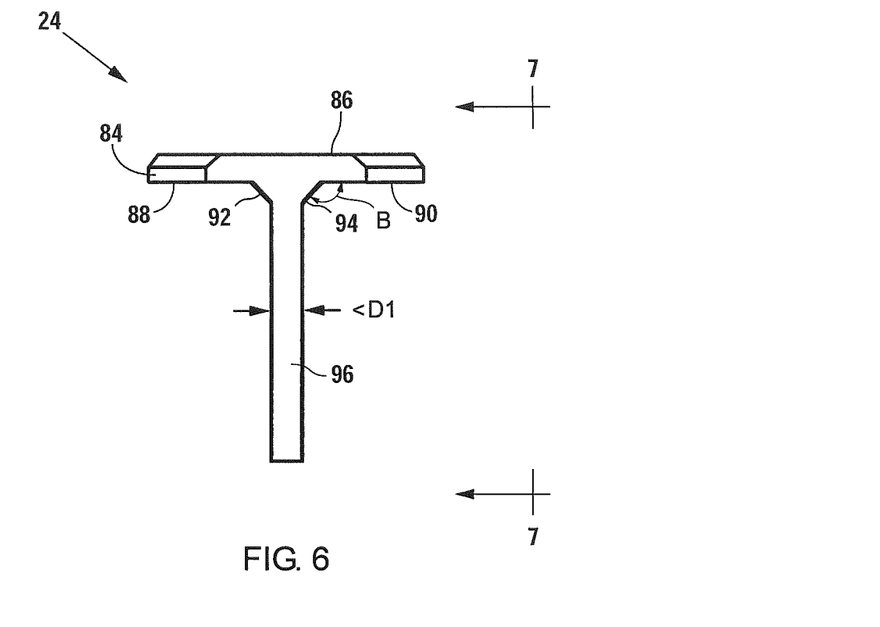
FIG. 6 is a side elevation from line 6-6 of FIG. 1.

Referring to FIG. 6, the clamp 24 includes a plate 84 having a planar first clamp surface 86, a planar second clamp surface 88 parallel to the first clamp surface 86, and a planar third clamp surface 90 coplanar with the second clamp surface 88. A planar fourth clamp surface 92 is adjacent to the second clamp surface 88 and angled at angle B, where B equals ninety degrees plus A, relative to the second clamp surface 88. A planar fifth clamp surface 94 is adjacent to the third clamp surface 90 and angled at an angle B relative to the third planar surface 90. A first finger 96 extends away from the plate 84 and has a width less than D1.

Figure 7:
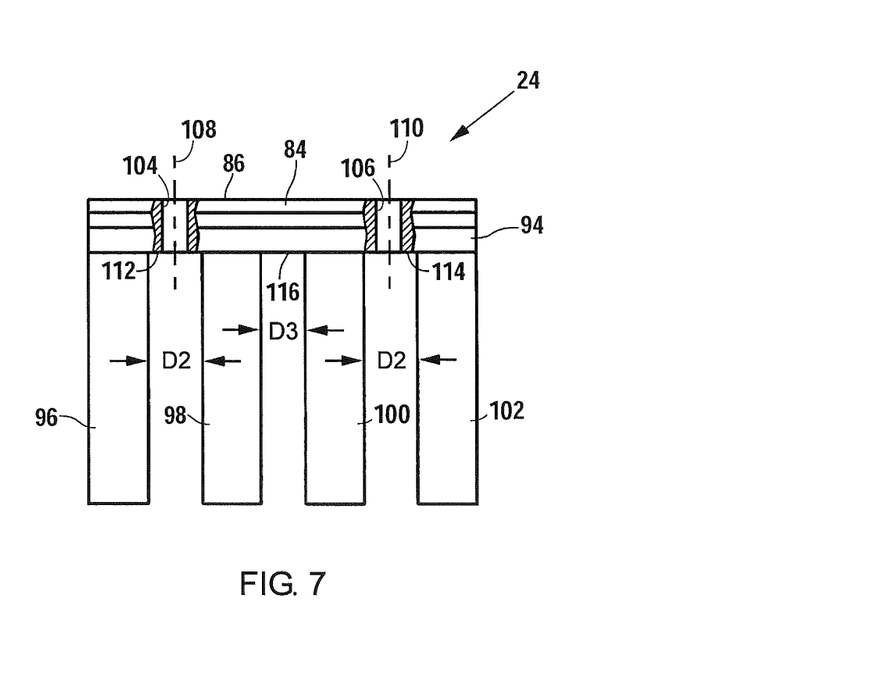
FIG. 7 is a side elevation from line 7-7 of FIG. 6.

Referring to FIG. 7, the first finger 96, a second finger 98, a third finger 100, and a fourth finger 102 extend away from the plate 84, with each finger being of the same width. Each finger is a rectangular cuboid with a first end proximal to the top plate 84 and an opposing end distal from the top plate 84. The fifth clamp surface 94 is adjacent to the proximal ends of the fingers. The distance between the first finger 96 and the second finger 98 is D2. The distance between the third finger 100 and the fourth finger 102 is D2. The distance between the second finger 98 and the third finger 100 is equal to D3, which is less than D2. In alternative embodiments, the distance between the first finger 96 and the second finger 98 may be different than the distances between the third finger 100 and the fourth finger 102.

The clamp 24 further includes two cylindrical surfaces 104, 106 that define holes having axes 108, 110 opening between the first clamp surface 86 and a planar seventh surface 112 and a planar eighth surface 114, respectively. The seventh surface 112 is adjacent to and between the proximal ends of the first finger 96 and the second finger 98. The first axis 108 is aligned with the space between the first and second fingers 96, 98. The second axis 110 is aligned with the space between the third and fourth fingers 100, 102. A planar ninth clamp surface 116 is adjacent to and between the proximal ends of the second finger 98 and the third finger 100.

Figure 8:
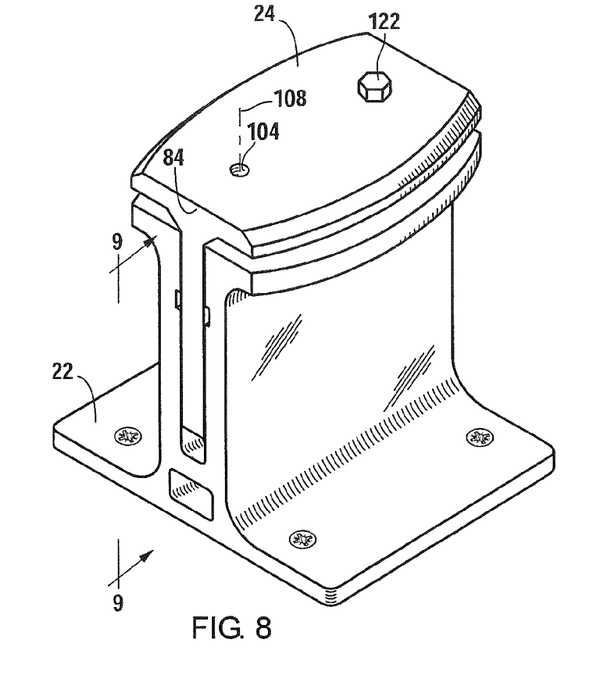
FIG. 8 is an isometric view of the first embodiment.
Figure 9:
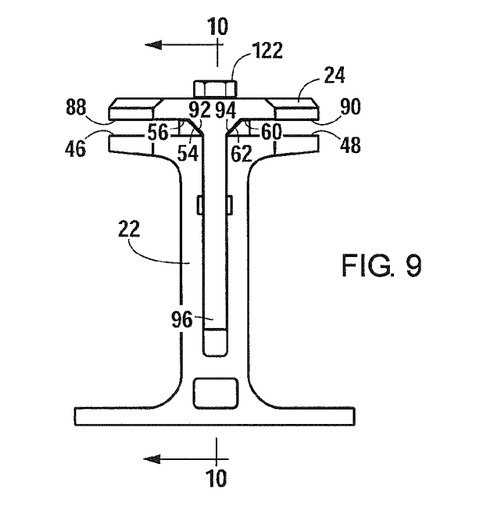
FIG. 9 is a side elevation from line 9-9 of FIG. 8.
Figure 10:
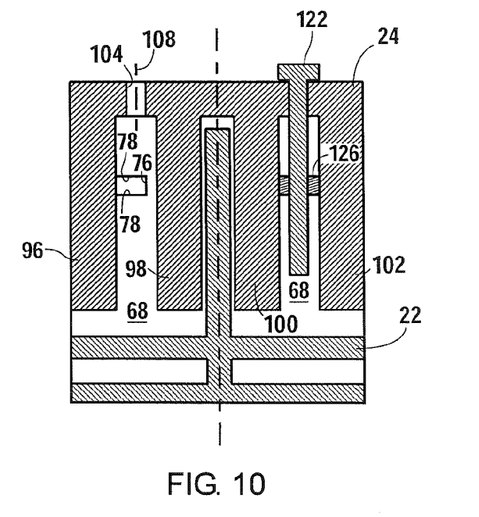
FIG. 10 is a sectional view along line 10-10 of FIG. 9.

Referring to FIGS. 8-10, the clamp 24 is attached to the base 22 with a bolt 122. Referring specifically to FIG. 10, the bolt 122 extends to a position within the channel 32 and between the third and fourth fingers 100, 102. A second nut 126 has a width-across-flats F greater than the channel width D1, but slightly less than D2 (see FIGS. 2, 4). The nut 126 is positioned in the third and fourth slots and threadedly engaged with the bolt 122. The first slot extends from one end of the base 22 a distance greater than the width of the first finger 96 but less than the sum of the width of the first finger 96 and D2. In other words, the first slot endwall 76 is longitudinally positioned between the first finger 96 and the second finger 98. The third slot extends from the other end of the base 22 the same distance, although in alternative embodiments, the slots may extend from ends of the base 22 separate distances.

Installation of the embodiment 20 is described with reference to FIG. 1. To install the embodiment 20, four decking screws 40 are positioned through the holes in the baseplate 26 to fix the base 22 to the roofing. The first nut 124 is placed in the channel 32 in the first slot and the second slot and moved (e.g., pushed with a screwdriver or other tool) to contact the first and second slot endwalls 76, 80. In this position, the first nut 124 is aligned with the first axis 108 when the clamp is installed. The second nut 126 is placed in the third slot and fourth slot and moved to the third and fourth slot endwalls 81, 85. Thereafter, the clamp 24 may be positioned relative to the base 22 by inserting the fingers 96, 98, 100, 102 into the channel 32. When the first nut 124 is positioned against the first and second slot endwall 76, 80, the first and second fingers 96, 98 will not be obstructed by the first nut 124 during insertion of the clamp 24. When the second nut 126 is positioned against the third and fourth slot endwalls 81, 85, the third and fourth fingers 100, 102 will not be obstructed by the second nut 126 during insertion. The space between the second finger 98 and third finger 100 is only slightly larger than the tie 66, which promotes proper alignment of the clamp 24 with the base 22 during insertion. Thereafter, bolts 120, 122 may be disposed through the holes and thread to the nuts 124, 126. Rotation of the nuts 124, 126 during threading of the bolts 120, 122 is inhibited by the respective slot surfaces. Although nuts 124, 126 are shown as hex nuts, other types of fasteners may also be used, such as square nuts.

Referring to FIG. 9, when properly installed, the angled surfaces 92, 94 of the clamp 24 are in contact with angled surfaces 54, 62, respectively, of the base 22. The second and third surfaces 88, 90 of the clamp 24 are in contact with the planar surfaces 56, 60. Thereafter, a solar panel may be partially positioned between the clamp 24 and the first beam 42. A second solar panel may be partially positioned between the clamp 24 and the second beam 44. The curved surfaces 58, 64 of the spacers 50, 52 are in contact with the panels and enables adjustment of panel placement.

Figure 11:
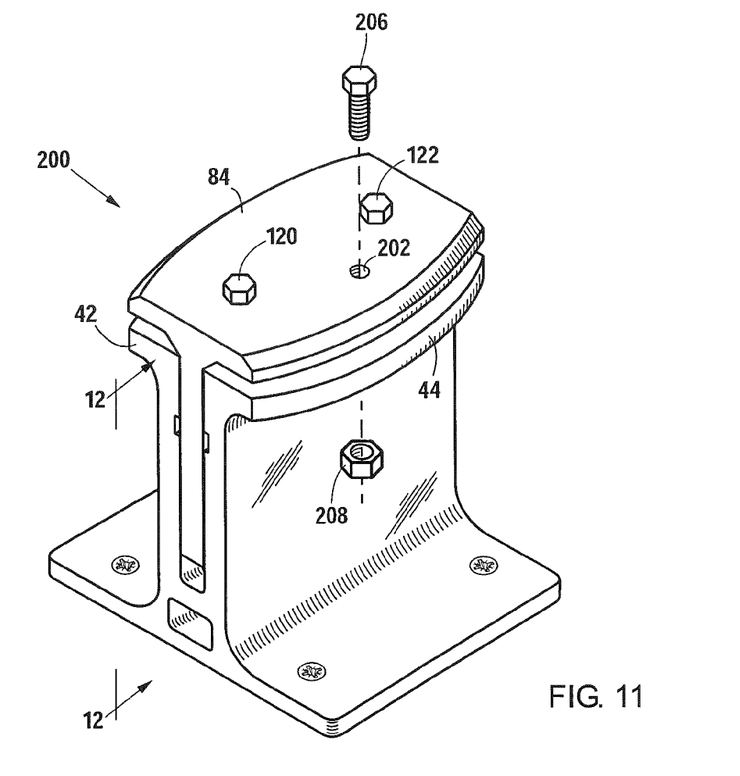
FIG. 11 is an isometric view of a second embodiment.
Figure 12:
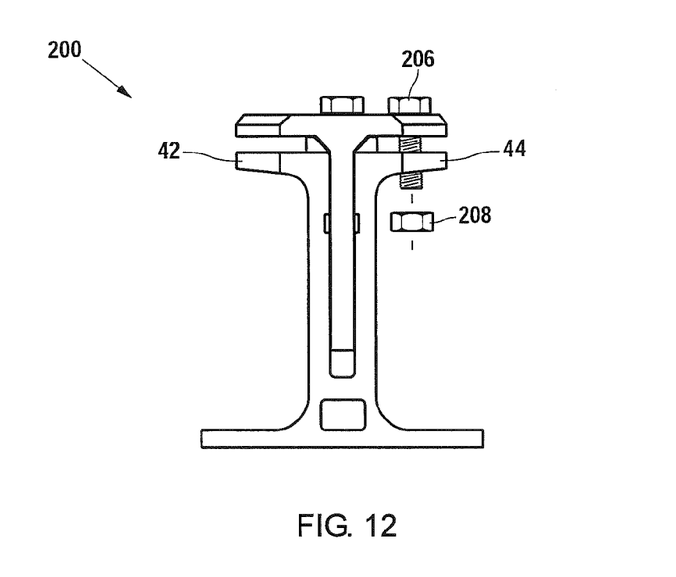
FIG. 12 is a side elevation from line 12-12 of FIG. 11.

Referring to FIGS. 11-12, an alternative embodiment 200 teaches a third cylindrical surface 202 defining a third hole through the clamp plate 84 and a cylindrical surface 204 (not shown) defining a hole through the second beam 44. When the embodiment 200 is only used with a single solar panel, the panel is positioned between the first beam 42 and the clamp 24. A bolt 206 fastens the clamp 24 to the base 22 with a third nut 208 to inhibit movement of the clamp 24 due to the lack of a load opposite the single solar panel.

The present invention is described in terms of a preferred and other specifically-described embodiments. Those skilled in the art will recognize that alternative embodiments of such device can be used in carrying out the present invention. Other aspects and advantages of the present invention may be obtained from a study of this disclosure and the drawings, along with the appended claims.

The invention claimed is:

1. A solar panel clamp assembly comprising:
   a base comprising:
      a baseplate;
      a first strut connected to said baseplate, said first strut having a first slot with a first slot endwall and a second slot with a second slot endwall;
      a second strut connected to said baseplate and spaced a first distance from said first strut forming a channel adjacent to said first slot and said second slot, said second strut having a third slot with a third slot endwall and a fourth slot with a fourth slot endwall;
      a first beam connected to the first strut opposite the baseplate, said first beam including a first beam surface; and
      a second beam connected to the second strut opposite the baseplate and opposite the channel from the first beam, said second beam including a second beam surface coplanar with said first beam surface;
   a clamp at least partially occupying the channel of the base, the clamp comprising:
      a plate having a first cylindrical surface defining a through hole having a first axis, and a second cylindrical surface defining a through hole having a second axis;
      at least one clamp surface adjacent to the plate and angled at a second angle relative to said plate;
      a first finger and a second finger adjacent to said at least one clamp surface, said second finger spaced a second distance from said first finger, said first axis intersecting the space between said first finger and said second finger; and
      a third finger and a fourth finger adjacent to said at least one clamp surface, said fourth finger spaced said second distance from said third finger, said third finger spaced a third distance from said second finger, and said second axis intersecting the space between said third finger and said fourth finger.

2. The clamp assembly of claim 1 wherein said base further comprises:
   a first spacer connected to said first beam surface, said first spacer having a first spacer surface adjacent to said channel and angled at a first angle relative to said first beam surface; and
   a second spacer connected to said second beam surface, said second spacer having a second spacer surface adjacent to said channel opposite said first spacer surface and angled at said first angle relative to said second beam surface.

3. The clamp assembly of claim 2 wherein said second angle equals said first angle plus ninety degrees.

4. The clamp assembly of claim 2 wherein said at least one clamp surface is in contact with the first spacer surface and the second spacer surface.

5. The clamp assembly of claim 1 further comprising a tie partially occupying said channel, said tie connected to said first strut and said second strut.

6. The clamp assembly of claim 1 wherein said base and said clamp are made from a nonconductive material.

7. The clamp assembly of claim 1 wherein said first slot endwall and said third slot endwall are positioned adjacent to the space between said first finger and said second finger, and wherein said third slot endwall and said fourth slot endwall are positioned adjacent to the space between said third finger and said second finger.

8. A base for a solar panel clamp assembly, the base comprising:
   a baseplate;
   a first strut connected to said baseplate, said first strut having a first slot with a first slot endwall and a second slot with a second slot endwall;
   a second strut connected to said baseplate and spaced a first distance from said first strut forming a channel adjacent to said first slot and said second slot, said second strut having a third slot with a third slot endwall and a fourth slot with a fourth slot endwall;
   a first beam connected to the first strut opposite the baseplate, said first beam including a first beam surface;
   a second beam connected to the second strut opposite the baseplate and opposite the channel from the first beam, said second beam including a second beam surface coplanar with said first beam surface;
   a first spacer connected to said first beam surface, said first spacer having a first spacer surface adjacent to said channel and angled at a first angle relative to said first beam surface; and
   a second spacer connected to said second beam surface, said second spacer having a second spacer surface adjacent to said channel opposite said first spacer surface and angled at said first angle relative to said second beam surface.

9. A clamp for a solar panel assembly, the clamp comprising:
   a plate having a first cylindrical surface defining a through hole having a first axis, and a second cylindrical surface defining a through hole having a second axis;
   a clamp surface adjacent said plate and angled at a second angle relative to said plate;
   a first finger and a second finger adjacent to said clamp surface, said second finger spaced a second distance from said first finger, said first axis intersecting the space between said first finger and said second finger; and
   a third finger and a fourth finger adjacent to said clamp surface, said fourth finger spaced said second distance from said third finger, said third finger spaced a third distance from said second finger, and said second axis intersecting the space between said third finger and said fourth finger.

* * * * *